US012682776B2

(12) United States Patent
Mt. Pleasant et al.

(10) Patent No.: US 12,682,776 B2
(45) Date of Patent: Jul. 14, 2026

(54) MIXED REALITY SCENARIO GENERATION FOR CROSS-INDUSTRY TRAINING

(71) Applicant: International Business Machines Corporation, Armonk, NY (US)

(72) Inventors: Mary A Mt. Pleasant, Tyngsboro, MA (US); Tushar Agrawal, West Fargo, ND (US); Sarbajit K. Rakshit, Kolkata (IN); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 17/823,188

(22) Filed: Aug. 30, 2022

(65) Prior Publication Data

US 2024/0071242 A1     Feb. 29, 2024

(51) Int. Cl.
*G09B 5/02*          (2006.01)
(52) U.S. Cl.
CPC ..................................... *G09B 5/02* (2013.01)
(58) Field of Classification Search
CPC . G09B 19/25; G09B 5/00; G09B 5/02; G09B 19/14
See application file for complete search history.

(56) References Cited

U.S. PATENT DOCUMENTS

| | | |
|---|---|---|
| 7,772,480 B2 | 8/2010 | Brennan |
| 9,330,502 B2 | 5/2016 | Tuchschmid |
| 9,881,515 B2 | 1/2018 | Moreno |
| 10,350,751 B2 | 7/2019 | Guerin |
| 10,751,877 B2 | 8/2020 | Wang |

(Continued)

FOREIGN PATENT DOCUMENTS

| | | |
|---|---|---|
| CN | 105023215 A | 11/2015 |
| CN | 105190724 A | 12/2015 |

(Continued)

OTHER PUBLICATIONS

Fillmore et al., "AR and VR in the Workplace", IBM Emerging technologies, Sep. 24, 2020, 9 Pages.

(Continued)

*Primary Examiner* — Robert J Utama
(74) *Attorney, Agent, or Firm* — Eric W. Chesley

(57) ABSTRACT

In an approach to mixed reality scenario generation for cross industry training, a computer receives data associated with tasks performed by a user. A computer identifies an activity in a first industry associated with the tasks. A computer determines that one or more activities associated with a job in a second industry are similar to the activity in the first industry. A computer generates a mixed reality scenario representing a virtual work environment associated with the second industry using mixed reality. A computer generates the one or more activities associated with the job in the second industry in the mixed reality scenario. A computer displays the virtual work environment associated with the second industry and the one or more activities associated with the job in the second industry to the user in a device for viewing a mixed reality scenario while the user performs the activity in the first industry.

20 Claims, 4 Drawing Sheets

(56) References Cited

U.S. PATENT DOCUMENTS

| | | | |
|---|---|---|---|
| 2003/0129575 A1* | 7/2003 | L'Allier | G09B 7/02 |
| | | | 434/362 |
| 2004/0191747 A1* | 9/2004 | Atsumori | G09B 7/02 |
| | | | 434/323 |
| 2007/0015124 A1* | 1/2007 | Mobbs | G09B 7/00 |
| | | | 434/219 |
| 2008/0233550 A1 | 9/2008 | Solomon | |
| 2012/0122062 A1 | 5/2012 | Yang | |
| 2013/0224709 A1* | 8/2013 | Riojas | G09B 23/28 |
| | | | 434/262 |
| 2021/0264808 A1 | 8/2021 | Rudden | |
| 2022/0130272 A1* | 4/2022 | Foroughi | G09B 7/00 |

FOREIGN PATENT DOCUMENTS

| | | |
|---|---|---|
| CN | 107838921 A | 3/2018 |
| CN | 110163580 A | 8/2019 |
| CN | 111105662 A | 5/2020 |

OTHER PUBLICATIONS

IBM Research, "Computer Vision and Augmented Reality", AI Multimedia, Jan. 25, 2022, 13 Pages.
IBM, "IBM Digital Twin Exchange", Jun. 30, 2022, 7 Pages.
IBM, "HR and Talent Management Transformation Consulting", Accessed on Sep. 30, 2025, 17 Pages.
IBM, "Cheat Sheet: What is a Digital Twin?", Dec. 4, 2020, 11 Pages.

* cited by examiner

MIXED REALITY SCENARIO GENERATION FOR CROSS-INDUSTRY TRAINING

BACKGROUND OF THE INVENTION

The present invention relates generally to the field of mixed reality, and more particularly to mixed reality scenario generation for cross industry training.

Mixed reality (MR) is the merging of real and virtual worlds to produce new environments and visualizations, where physical and digital objects co-exist and interact in real time. Mixed reality does not exclusively take place in either the physical world or virtual world but is a hybrid of augmented reality and virtual reality, where augmented reality takes place in the physical world, with information or objects added virtually like an overlay, versus virtual reality, which immerses a user in a fully virtual world without the intervention of the physical world. There are many practical applications of mixed reality, including design, entertainment, training, and remote working. There are also different display technologies used to facilitate the interaction between users and mixed reality applications.

A head mounted display (HMD) device, such as augmented reality glasses, may provide an enhanced view of the real-world environment by incorporating computer-generated information with a view of the real world. Such display devices may further be remote wireless display devices such that the remote display device provides an enhanced view by incorporating computer-generated information with a view of the real world. In particular, augmented reality devices, such as augmented reality glasses, may provide for overlaying virtual graphics over a view of the physical world. As such, methods of navigation and transmission of other information through augmented reality devices may provide for richer and deeper interaction with the surrounding environment. The usefulness of augmented reality devices relies upon supplementing the view of the real world with meaningful and timely virtual graphics.

The Internet of Things (IoT) is the inter-networking of physical devices (also referred to as "connected devices" and "smart devices"), vehicles, buildings, and other items, embedded with electronics, software, sensors, actuators, and network connectivity that enable these objects to collect and exchange data. The IoT allows objects to be sensed and/or controlled remotely across existing network infrastructure, creating opportunities for more direct integration of the physical world into computer-based systems, and resulting in improved efficiency, accuracy, and economic benefit in addition to reduced human intervention. Each "thing" is uniquely identifiable through its embedded computing system but is able to interoperate within the existing Internet infrastructure.

A digital twin refers to a digital representation of a physical or human asset. In Internet of Things (IoT) systems, a digital twin can represent an evolving virtual data model that mimics the asset as well as the experiences and state changes of the asset. A digital twin may be said to store and track information about its twin asset.

SUMMARY

Embodiments of the present invention disclose a computer-implemented method, a computer program product, and a system for mixed reality scenario generation for cross industry training. The computer-implemented method may include a computer receiving data associated with one or more tasks performed by a user. A computer identifies an activity in a first industry associated with the one or more tasks. A computer determines that one or more activities associated with a job in a second industry are similar to the activity in the first industry. A computer generates a mixed reality scenario representing a virtual work environment associated with the second industry using mixed reality technology. A computer generates the one or more activities associated with the job in the second industry in the mixed reality scenario. A computer displays the virtual work environment associated with the second industry and the one or more activities associated with the job in the second industry to the user in a device for viewing a mixed reality scenario while the user performs the activity in the first industry

DETAILED DESCRIPTION

Different types of jobs in different industries, such as hospitality, product delivery, ecommerce, and health care, require different skills. There may be some degree of similarity between jobs in different industries, but many jobs have a unique job profile for which a worker must be cross trained before accepting a new role. For example, in product delivery, an employee delivers products to a customer location, while in health care, an employee provides patient service, and in hospitality, an employee provides services to guests. As the work environment transforms, with some industries growing while others shrink, employees need to transform as well, by cross training for a job in a growing industry.

Embodiments of the present invention recognize that efficiency may be gained by enabling an employee to cross train for a position in a new industry while still working in a current job. Embodiments of the present invention generate a mixed reality scenario that provides an employee with training for a job in a different industry that uses skills similar to those of the current job of the employee. Implementation of embodiments of the invention may take a variety of forms, and exemplary implementation details are discussed subsequently with reference to the Figures.

Figure 1:
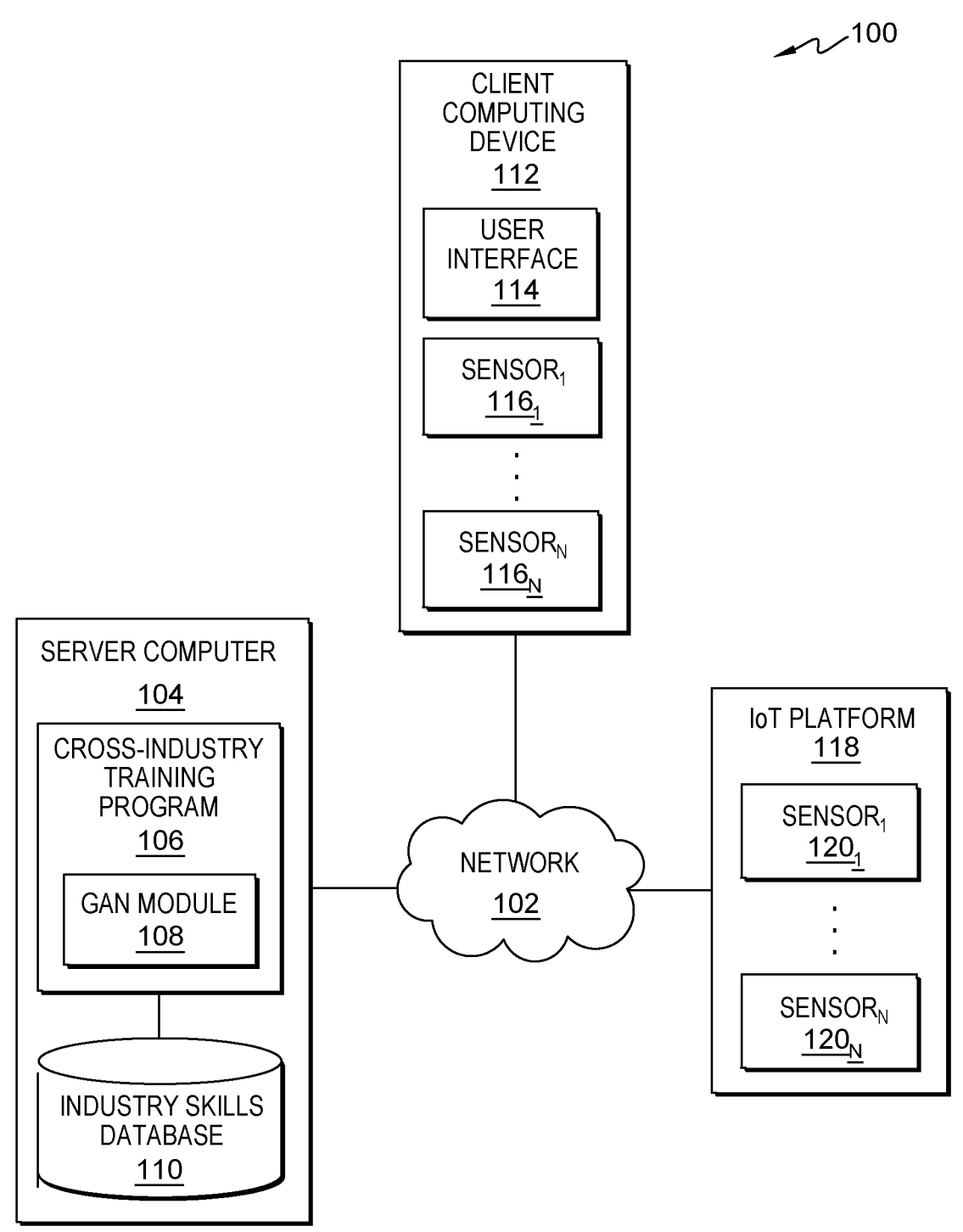
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104, client computing device 112, and Internet of Things (IoT) platform 118, all interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between server computer 104, client computing device 112, IoT platform 118, and other computing devices (not shown) within distributed data processing environment 100.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, an edge device, a containerized workload, or any programmable electronic device capable of communicating with client computing device 112, IoT platform 118, and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes cross-industry training program 106 and industry skills database 110. Server computer 104 may include internal and external hardware components, as depicted and described in further detail with respect to FIG. 4.

Cross-industry training program 106 is a cross-industry learning platform in mixed reality for improving a skillset of an employee. Cross-industry training program 106 generates mixed reality scenarios by determining similarities between tasks performed in different industries and then providing user-specific, cross industry training using the mixed reality scenarios. Although referred to herein as "different industries," cross-industry training program 106 can also be used to cross train an employee in a different job or role in the same industry in which the user is currently employed. Further, as used herein, a job includes one or more activities, and an activity includes one or more tasks. Cross-industry training program 106 receives activity data from users in an industry. Cross-industry training program 106 identifies industry activity tasks. Cross-industry training program 106 identifies a work environment of the industry. Cross-industry training program 106 stores the industry activity tasks and work environment. Cross-industry training program 106 repeats this process for a plurality of industries. Cross-industry training program 106 compares activity tasks between industries and determines task similarities and/or dissimilarities between industries. Cross-industry training program 106 stores the task similarities and/or dissimilarities.

Upon receiving a request from a user for cross training, cross-industry training program 106 receives task data from the user. Cross-industry training program 106 identifies the current activity and determines a similar activity in another industry. Cross-industry training program 106 determines requirements for work environment modifications to enable the cross-training. Cross-industry training program 106 generates a virtual work environment and similar virtual activities. Cross-industry training program 106 displays the virtual work environment. Cross-industry training program 106 monitors the activity performance of the user and stores user activity data in a user profile. If cross-industry training program 106 determines that the performance of the activity is not acceptable, then cross-industry training program 106 notifies the user that training is not complete and continues to receive task data from the user. If cross-industry training program 106 determines that the performance of the activity is acceptable, then cross-industry training program 106 notifies the user that training is complete. Cross-industry training program 106 includes generative adversarial network (GAN) module 108. Cross-industry training program 106 is depicted and described in further detail with respect to FIG. 2 and FIG. 3.

It should be noted herein that in the described embodiments, participating parties have consented to being recorded and monitored, and participating parties are aware of the potential that such recording and monitoring may be taking place. In various embodiments, for example, when downloading or operating an embodiment of the present invention, the embodiment of the invention presents a terms and conditions prompt enabling the user to opt-in or opt-out of participation. Similarly, in various embodiments, emails and texts begin with a written notification that the user's information may be recorded or monitored and may be saved, for the purpose of generating cross training scenarios. These embodiments may also include periodic reminders of such recording and monitoring throughout the course of any such use. Certain embodiments may also include regular (e.g., daily, weekly, monthly) reminders to the participating parties that they have consented to being recorded and monitored for generating cross training scenarios and may provide the participating parties with the opportunity to opt-out of such recording and monitoring if desired. Furthermore, to the extent that any non-participating parties' actions are monitored (for example, when outside vehicles are viewed), such monitoring takes place for the limited purpose of providing navigation assistance to a participating party, with protections in place to prevent the unauthorized use or disclosure of any data for which an individual might have a certain expectation of privacy.

GAN module 108 is one or more of a plurality of machine learning frameworks that includes two neural networks. Given a training set, GAN module 108 learns to generate new data with the same statistics as the training set. For example, a GAN trained on photographs or video images can generate new images that look at least superficially authentic to human observers, having many realistic characteristics. In an embodiment, cross-industry training program 106 uses GAN module 108 to perform the generation of mixed reality work activity content and align the content with a current activity of an employee.

Industry skills database 110 stores information used by and generated by cross-industry training program 106, client computing device 112, and IoT platform 118. In the depicted embodiment, industry skills database 110 resides on server computer 104. In another embodiment, industry skills database 110 may reside elsewhere within distributed data processing environment 100, provided that cross-industry training program 106, client computing device 112, and IoT platform 118 have access to industry skills database 110, via network 102. A database is an organized collection of data. Industry skills database 110 can be implemented with any type of storage device capable of storing data and configuration files that can be accessed and utilized by cross-industry training program 106, client computing device 112, and IoT platform 118, such as a database server, a hard disk drive, or a flash memory. Industry skills database 110 is a knowledge corpus composed of activity data from a plurality of industries, historically gathered by cross-industry training program 106. Activity data associated with an activity and/or job role may include, but is not limited to, types of movement, responsibilities, criticality, goals, etc. Industry skills database 110 stores data from a plurality of sensors that reside on client computing device 112 and IoT platform 118. In an embodiment, the data received from the plurality of sensors is stored as encrypted data. Industry skills database 110 may also store, and be organized by, a plurality of industry categories such that various activities can be associated with a specific industry. Additionally, industry skills database 110 stores pre-defined job descriptions and criteria for each job role in each industry for use in determining whether the training of a user in that job role is complete and/or acceptable. Further, industry skills database 110 stores one or more digital twin simulation models generated by cross-industry training program 106.

In addition, industry skills database 110 stores a user profile for the user of client computing device 112. The user profile may include, but is not limited to, the name of the user, an address, an email address, a voice sample, a phone number, a credit card number, an account number, an employer, a job role, a job family, a business unit association, a job seniority, a job level, a resume, a medical record, a social network affiliation, etc. The user profile may also include user preferences, such as work environment preferences, for example, a desk job versus a physically demanding job, industry preferences, specific job preferences, etc. In addition to a user profile generated for a specific user, industry skills database 110 also stores one or more industry-specific profiles generated by cross-industry training program 106 for the user that track performance of activities in the one or more industries in which the user is cross training. Further, industry skills database 110 stores one or more similarity thresholds used when cross-industry training program 106 determines whether a cross training course matches a user profile. In addition, industry skills database 110 may store a similarity score between tasks of at least two different industries calculated by cross-industry training program 106.

The present invention may contain various accessible data sources, such as industry skills database 110, that may include personal data, content, or information the user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data.

Cross-industry training program 106 enables the authorized and secure processing of personal data. Cross-industry training program 106 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Cross-industry training program 106 provides information regarding personal data and the nature (e.g., type, scope, purpose, duration, etc.) of the processing. Cross-industry training program 106 provides the user with copies of stored personal data. Cross-industry training program 106 allows the correction or completion of incorrect or incomplete personal data. Cross-industry training program 106 allows the immediate deletion of personal data.

Client computing device 112 can be one or more of a laptop computer, a tablet computer, a smart phone, smart watch, a smart speaker, or any programmable electronic device capable of communicating with various components and devices within distributed data processing environment 100, via network 102. Client computing device 112 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In an embodiment, the wearable computer may be in the form of a smart watch. In one embodiment, the wearable computer may be in the form of a head mounted display (HMD). The HMD may take the form-factor of a pair of glasses, such as augmented reality (AR) glasses, which is a device for viewing mixed reality and/or augmented reality scenarios. In the embodiment where the HMD is a pair of AR glasses, the AR glasses can capture eye gaze information from a gaze point tracker, such as a camera associated with client computing device 112. In general, client computing device 112 represents one or more programmable electronic devices or combination of programmable electronic devices capable of executing machine readable program instructions and communicating with other computing devices (not shown) within distributed data processing environment 100 via a network, such as network 102. Client computing device 112 includes an instance of user interface 114 and sensor $116_{1\text{-}N}$.

User interface 114 provides an interface between cross-industry training program 106 on server computer 104 and a user of client computing device 112. In one embodiment, user interface 114 is mobile application software. Mobile application software, or an "app," is a computer program designed to run on smart phones, tablet computers and other mobile devices. In one embodiment, user interface 114 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In an embodiment, user interface 114 enables a user of client computing device 112 to receive training courses. In an embodiment, user interface 114 enables a user of client computing device 112 to input data to be included in a user profile stored in industry skills database 110. In an embodiment, user interface 114 enables a user of client computing device 112 to receive notifications from cross-industry training program 106.

IoT platform 118 is a suite of components that enable a) deployment of applications that monitor, manage, and control connected devices and sensors; b) remote data collection from connected devices; and c) independent and secure connectivity between devices. The suite of components may include, but are not limited to, a hardware architecture, an operating system, a runtime library, an edge device, and/or a containerized workload (not shown). In the depicted embodiment, IoT platform 118 includes sensor 120$_{1-N}$. In another embodiment, IoT platform 118 may include a plurality of other computing devices.

A sensor is a device that detects or measures a physical property and then records or otherwise responds to that property, such as vibration, chemicals, radio frequencies, environment, weather, humidity, light, etc. Sensor 116$_{1-N}$ and sensor 120$_{1-N}$, herein sensor(s) 116 and sensor(s) 120, detect a plurality of attributes of client computing device 112 and IoT platform 118, respectively. As used herein, N represents a positive integer, and accordingly the number of scenarios implemented in a given embodiment of the present invention is not limited to those depicted in FIG. 1. In an embodiment, sensor(s) 116 and sensor(s) 120 detect a plurality of attributes of the environment surrounding the user, such as the work environment. Sensor(s) 116 and sensor(s) 120 may be one or more of a plurality of types of camera, including, but not limited to, pin-hole, stereo, omni-directional, non-central, infrared, video, digital, three dimensional, panoramic, filter-based, wide-field, narrow-field, telescopic, microscopic, etc. In some embodiments, sensor(s) 116 and sensor(s) 120 include any device capable of imaging a portion of the electromagnetic spectrum. Sensor(s) 116 and sensor(s) 120 may be one or more of a plurality of types of microphone for detecting speech and other audible sounds. Sensor(s) 116 and sensor(s) 120 may be able to detect weather conditions, such as air temperature, relative humidity, presence and type of precipitation, wind speed, etc. Sensor(s) 116 and sensor(s) 120 may be global positioning system (GPS) sensors. For example, sensor(s) 116 may use GPS to detect the location of the user of client computing device 112. Sensor(s) 116 and sensor(s) 120 may include various types of pressure sensors and/or strain gauges to detect a person sitting or standing in a particular location. Sensor(s) 116 and sensor(s) 120 may include various types of accelerometers to detect movement or vibration of client computing device 112 and/or a component included in IoT platform 118. Sensor(s) 116 may include biometric sensors for detecting the physical condition of the user, such as blood pressure, heart rate, respiratory rate, calories burned, calories consumed, pulse, oxygen levels, blood oxygen level, glucose level, blood pH level, salinity of user perspiration, skin temperature, galvanic skin response, electrocardiography (ECG or EKG) data, body temperature, eye tracking data, etc. In one embodiment, sensor(s) 116 and sensor(s) 120 transmit data directly to industry skills database 110.

Figure 2:
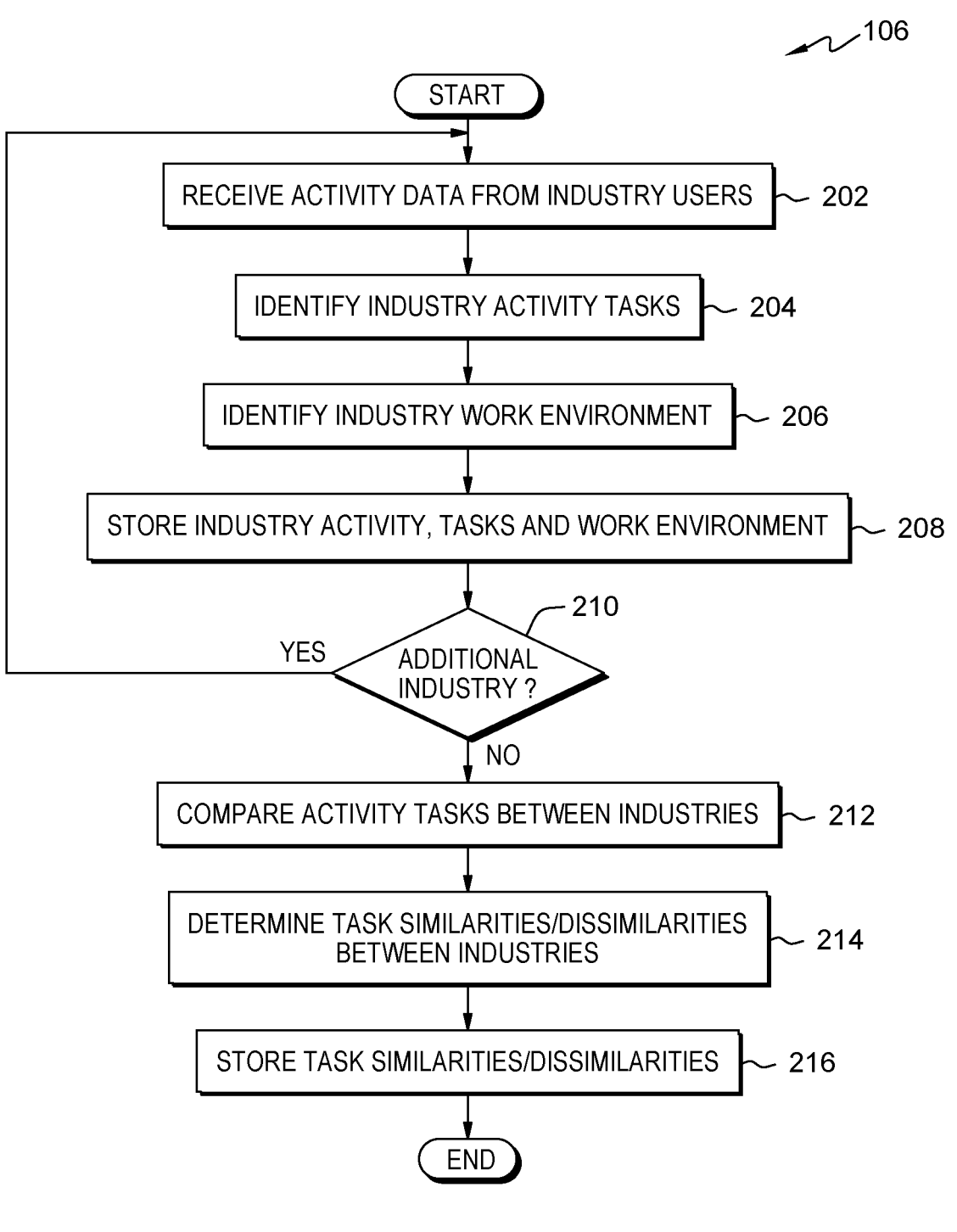
FIG. 2 is a flowchart depicting operational steps of a cross-industry training program, on a server computer within the distributed data processing environment of FIG. 1, for generating mixed reality scenarios, in accordance with an embodiment of the present invention.

FIG. 2 is a flowchart depicting operational steps of cross-industry training program 106, on server computer 104 within distributed data processing environment 100 of FIG. 1, for generating mixed reality scenarios, in accordance with an embodiment of the present invention.

Cross-industry training program 106 receives activity data from users in an industry (step 202). In an embodiment, in order to create a knowledge corpus of activity data from a plurality of industries, cross-industry training program 106 receives data from one or more employees, i.e., users, in each industry for analysis and storage in industry skills database 110. In an embodiment, one or more employees volunteer to contribute activity data to the knowledge corpus. In an embodiment, activity data associated with a user of client computing device 112 is detected by sensor(s) 116. For example, if one of sensor(s) 116 is a heart rate monitor, then cross-industry training program 106 receives data associated with the user's exertion while performing an activity from data generated by the heart rate monitor. In an embodiment, activity data is detected by sensor(s) 120. For example, if one of sensor(s) 120 is a camera located in a work area, then cross-industry training program 106 may receive data associated with user's movements while performing an activity from images generated by the camera. In an embodiment, cross-industry training program 106 uses crowdsourcing to receive activity data from one or more experts in the field. For example, cross-industry training program 106 may distribute a request for input using one or more social media platforms. In an embodiment, cross-industry training program 106 receives activity data by retrieving data from publicly available documentation, such as training manuals and job descriptions.

Cross-industry training program 106 identifies industry activity tasks (step 204). In an embodiment, based on the received activity data associated with an industry, cross-industry training program 106 identifies one or more tasks included in an activity associated with the industry. For example, if an activity is delivering parts to a manufacturing floor, then the associated tasks may include receiving a request, pulling parts from a warehouse, placing parts on a cart, and wheeling the cart to the manufacturing floor. In an embodiment, cross-industry training program 106 analyzes the data feeds from sensor(s) 116 and sensor(s) 120 and matches the data to pre-defined job descriptions to identify the tasks. In another embodiment, cross-industry training program 106 uses the received data to define various tasks/ activities, including how tasks are to be performed, e.g., what movements are required, roles, responsibilities, etc. In an embodiment, in addition to identifying how an employee is performing a task, cross-industry training program 106 identifies the time at which the employee begins the task and the time at which the employee ends the task.

Cross-industry training program 106 identifies a work environment of the industry (step 206). In an embodiment, for each activity associated with an industry, cross-industry training program 106 identifies a work environment. In an embodiment, cross-industry training program 106 uses data received from sensor(s) 116 and/or sensor(s) 120 to identify the work environment. For example, cross-industry training program 106 may receive decibel levels of noise in an area from a sensor that includes a microphone. In another example, cross-industry training program 106 may receive details of the space in which an activity is performed from one or more cameras in the area, such that cross-industry training program 106 can identify the height of shelving, the number of employees performing the same task, tools being used, etc.

Cross-industry training program 106 stores the industry activity, tasks, and work environment (step 208). In an embodiment, cross-industry training program 106 stores the identified activity, one or more tasks associated with the activity, and the identified work environment in industry skills database 110 in association with the industry to which the items correspond. Continuing the previous example, cross-industry training program 106 stores the tasks of receiving a request, pulling parts from a warehouse, placing parts on a cart, and wheeling the cart to the manufacturing floor in association with the activity called "delivering parts to a manufacturing floor" in an industry category labelled "manufacturing" in industry skills database 110.

Cross-industry training program 106 determines whether data is available from an additional industry (decision block 210). In an embodiment where cross-industry training program 106 receives data from users in a particular industry one industry at a time, cross-industry training program 106 determines whether data is available from another industry. In another embodiment, cross-industry training program 106 continuously receives data from users in more than one industry simultaneously. If cross-industry training program 106 determines that data is available from an additional industry ("yes" branch, decision block 210) then cross-industry training program 106 returns to step 202 to receive additional activity data.

If cross-industry training program 106 determines that data is not available from an additional industry ("no" branch, decision block 210) then cross-industry training program 106 compares activity tasks between industries (step 212). In an embodiment, cross-industry training program 106 compares the identified activities and associated tasks from at least one industry to at least one additional industry. For example, cross-industry training program 106 compares attributes of the tasks such as an associated movement needed to perform a task, a tool needed to perform a task, a role associated with a task, a responsibility associated with a task, an education level associated with a task, etc.

Cross-industry training program 106 determines task similarities and/or dissimilarities between industries (step 214). In an embodiment, based on the comparison of tasks between two or more industries, cross-industry training program 106 identifies similarities and/or dissimilarities, i.e., differences, between the tasks. For example, cross-industry training program 106 may determine that pushing a food service cart in a hotel is similar to pushing a cart loaded with packages in a warehouse. In an embodiment, cross-industry training program 106 determines similarities and/or differences between job roles in different industries. For example, cross-industry training program 106 may determine the similarities between an administrative assistant role in the health care industry versus the hospitality industry.

In an embodiment, cross-industry training program 106 determines a degree of similarity between two tasks. For example, cross-industry training program 106 may calculate a similarity score between tasks of at least two different industries based on a pre-defined number, i.e., threshold, of attributes of the task. In an embodiment, cross-industry training program 106 stores the similarity score in industry skills database 110.

In an embodiment, cross-industry training program 106 generates a digital twin simulation model of a worker performing activities and/or tasks for each industry. Using the digital twin simulation, cross-industry training program 106 can identify any challenges and/or problems a worker may have performing one or more activities in one industry and compare those challenges to similar activities performed successfully in other industries. From the comparison, cross-industry training program 106 can generate a cross learning platform for the industry activity with the challenges to improve how that activity is performed by the workers.

In another embodiment, cross-industry training program 106 generates a digital twin simulation model of a worker performing activities and/or tasks for each industry in order to simulate one or more "what if" scenarios. For example, cross-industry training program 106 may create a simulation of what a worker should do during a power outage or a fire in the work environment. By generating simulations of exception use cases, cross-industry training program 106 can provide training for workers in various industries in advance of an actual emergency, either in the current assignment of the worker or in an assignment for which the worker is training.

Cross-industry training program 106 stores the task similarities and/or dissimilarities (step 216). In an embodiment, cross-industry training program 106 stores the determined task similarities and/or dissimilarities in association with the stored one or more tasks associated with the activity in industry skills database 110. In an embodiment, cross-industry training program 106 stores the task similarities and/or dissimilarities in each industry category that corresponds to the task comparison. Continuing the previous example, cross-industry training program 106 stores the similarities between pushing a food service cart in a hotel and pushing a cart loaded with packages in a warehouse in both "hospitality" and "distribution" industry categories. As will be discussed with respect to FIG. 3, cross-industry training program 106 uses the stored task similarities and/or dissimilarities to generate mixed reality scenarios for cross-industry training.

Figure 3:
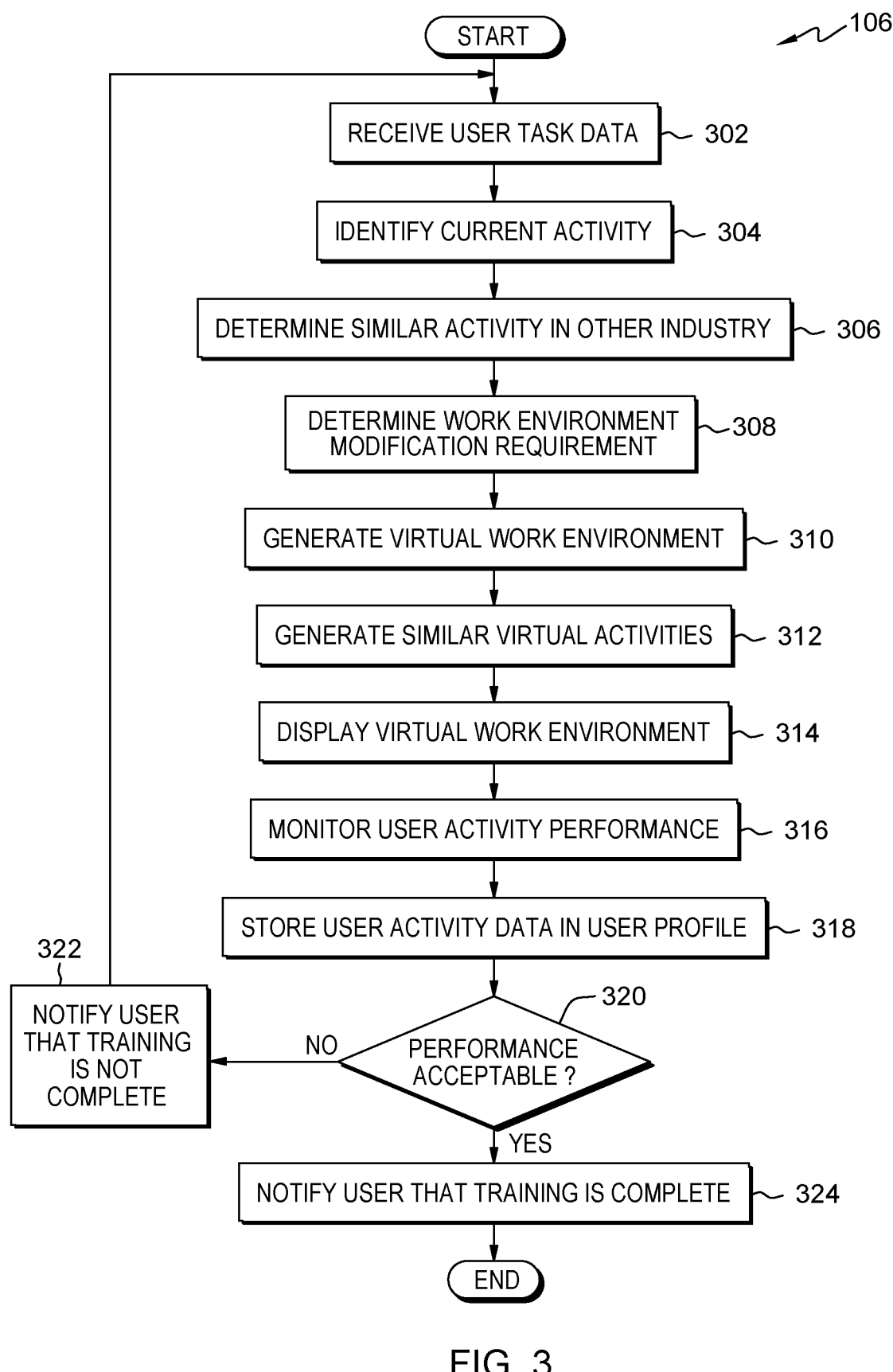
FIG. 3 is a flowchart depicting operational steps of the cross-industry training program, on the server computer within the distributed data processing environment of FIG. 1, for generating user-specific, cross industry training, in accordance with an embodiment of the present invention.

FIG. 3 is a flowchart depicting operational steps of cross-industry training program 106, on server computer 104 within distributed data processing environment 100 of FIG. 1, for generating user-specific, cross industry training, in accordance with an embodiment of the present invention.

Cross-industry training program 106 receives task data from a user (step 302). In an embodiment, a user with a desire to cross train to a job in a different industry opts in to cross-industry training program 106, via user interface 114, and inputs or updates a user profile stored in industry skills database 110. In one embodiment, the user includes one or more preferences for other jobs in the user profile. In an embodiment, cross-industry training program 106 presents a list of courses for job training to the user that match the profile of the user's current job and/or skillset. In an embodiment, cross-industry training program 106 determines that one or more courses exceed a similarity threshold to match, such as a percentage, prior to presenting the course as a choice for the user. In an embodiment, cross-industry training program 106 presents the user with the data associated with the match, via user interface 114, such that the user can decide if the recommended new job is of interest to the user.

Once a user opts in to, or invokes, cross-industry training program 106, cross-industry training program 106 receives data from the user associated with a task corresponding to an activity the user is currently performing. In one embodiment, cross-industry training program 106 receives the task data from sensor(s) 116. For example, cross-industry training program 106 receives data associated with the location of the user from a GPS sensor. In another embodiment, cross-industry training program 106 receives task data from sensor(s) 120. For example, cross-industry training program 106 receives video images of the user from a video camera. In a further embodiment, cross-industry training program 106 receives task data from both sensor(s) 116 and sensor(s) 120. In yet another embodiment, cross-industry training program 106 receives task data directly from the user via user interface 114. For example, the user may input text describing the current task into user interface 114, and cross-industry training program 106 receives the input and analyzes the text using one or more natural language processing (NLP) techniques.

Cross-industry training program 106 identifies the current activity of the user (step 304). In an embodiment, based on the received task data, cross-industry training program 106 identifies the activity and/or task that the user is currently performing. In an embodiment, cross-industry training program 106 compares activity and/or task data associated with the industry in which the user is currently working, which cross-industry training program 106 previously stored in industry skills database 110, to the received task data of the activity the user is currently performing to determine a match between the current activity of the user and a stored activity. Based on the match, cross-industry training program 106 identifies the current activity of the user.

Cross-industry training program 106 determines a similar activity in another industry (step 306). In an embodiment, in order to begin a cross training program for the user, cross-industry training program 106 compares the identified current activity of the current industry to activities in other industries stored in industry skills database 110 to determine an activity in another industry that is similar to the activity the user is currently performing. In an embodiment, cross-industry training program 106 determines the identified current activity is similar to another activity based on similarity of tasks included in each activity. For example, cross-industry training program 106 may compare the movements of the user, the tools the activity requires, the physical attributes needed for a user to perform the activity, etc. In an embodiment, similarity of activities is based on a quantity of tasks of one activity exceeding a pre-defined threshold quantity of similar tasks in the other activity. In an embodiment, if a user has specified a preference for a job in a particular industry in a user profile stored in industry skills database 110, then cross-industry training program 106 determines a similar activity in the preferred industry. In an embodiment, if cross-industry training program 106 determines a similar activity in more than one industry, then cross-industry training program 106 offers a choice of industry to the user, via user interface 114. For example, cross-industry training program 106 may send a message to the user that states "I have found a similar activity associated with a job role in the hospitality industry and in the health care industry. Which industry do you prefer for cross training?"

Cross-industry training program 106 determines work environment modification requirements (step 308). In an embodiment, based on data feeds from sensor(s) 116 and sensor(s) 120, cross-industry training program 106 analyzes the current work environment, i.e., the environment in which the user is performing the current activity, and determines one or more differences between the current work environment and the work environment of the similar activity in a different industry for which the user will be cross training. The analysis indicates to cross-industry training program 106 how to virtually represent the different industry in the user's current work environment via client computing device 112 and user interface 114. In an embodiment, cross-industry training program 106 determines parameters of the other industry setup in terms of job details, tools required, surrounding area, etc., which cross-industry training program 106 overlays on the current working environment of the user in the field of view of client computing device 112 to create a mixed reality work environment using mixed reality technology. In an embodiment, cross-industry training program 106 determines the feasibility of one or more modifications to the work environment, such as whether the user can move a table or chair, for example, in order to achieve precision in the alignment of virtual work environment overlayed on the current work environment.

Cross-industry training program 106 generates a virtual work environment (step 310). In an embodiment, using the determined parameters, cross-industry training program 106 generates a mixed reality work environment scenario using mixed reality technology in which the user can perform one or more activities and/or tasks associated with the current job while virtually performing similar activities and/or tasks in a job for which the user is cross training. In an embodiment, cross-industry training program 106 uses GAN module 108 to perform generation of the virtual work environment. For example, the virtual work environment can include, but is not limited to, one or more tools and/or machines, one or more other workers, one or more manuals and/or instruction sheets for the user to read, one or more signs on the walls, various locations, rooms, offices, etc.

Cross-industry training program 106 generates similar virtual activities (step 312). In an embodiment, cross-industry training program 106 generates a mixed reality work session in another industry that includes the previously determined similar activities and aligns with the current activities the user is performing. In an embodiment, cross-industry training program 106 uses GAN module 108 to perform generation of the similar virtual activities.

Cross-industry training program 106 displays the virtual work environment (step 314). In an embodiment, client computing device 112 is a head mounted, augmented and/or mixed reality display device, such as glasses, and cross-industry training program 106 overlays the previously generated mixed reality work environment scenario of the other industry, via user interface 114, in the user's current environment such that the field of view of the user shows the work environment of the job in the other industry for which the user is cross training while the user continues to perform the current job. For example, if the current work environment of the user is pushing a food service cart in a hotel, and the user is cross training to work in a warehouse, then cross-industry training program 106 displays a cart loaded with packages in a virtual warehouse environment aligned with the food service cart such that the user can visualize the warehouse job. In an embodiment, as the user continues to perform various tasks in the current job, cross-industry training program 106 continuously updates the virtual work environment and virtual tasks to align with the user's current tasks. While the user continues to perform the various tasks, the user can assess a level of competency in the job of the other industry and can also identify the similarity between the user's current job and the job for which the user is cross training. In an embodiment, cross-industry training program 106 also displays other virtual workers in the mixed reality environment such that the user can also observe the activities of the virtual workers for additional training.

Cross-industry training program 106 monitors the activity performance of the user (step 316). In an embodiment, cross-industry training program 106 continuously monitors the performance of the virtual activity by the user, i.e., user activity data, such that cross-industry training program 106 can provide an assessment of the skill of the user in the cross trained activity. In an embodiment, cross-industry training program 106 assesses the competency and/or accuracy of the user's actual performance as compared to actual performance data associated with workers in that industry that is stored in industry skills database 110. In an embodiment, cross-industry training program 106 uses digital twin technology to create a simulation model of the virtual activity performed by the user based on the movements of the user, e.g., body movements, hand movements, finger movements, leg movements, foot movements, etc. In the embodiment, cross-industry training program 106 can compare the performance of the digital twin model to the activity data stored in industry skills database 110 for the associated activities to assess the competency and/or accuracy of the user's actual performance.

Cross-industry training program 106 stores user activity data in a user profile (step 318). In an embodiment, cross-industry training program 106 stores the user activity data associated with the cross training in a user profile associated with the user and stored in industry skills database 110. In an embodiment, cross-industry training program 106 generates an industry-specific user profile for the user to track performance of activities in the one or more industries in which the user is cross training. For example, if a user is currently employed in a warehouse but is cross training for jobs in both the healthcare industry and the hospitality industry, then cross-industry training program 106 creates a healthcare user profile and a hospitality user profile for the user to track the user's cross training progress in each industry separately.

Cross-industry training program 106 determines whether the performance of the activity by the user is acceptable (decision block 320). In an embodiment, cross-industry training program 106 compares the performance of the virtual activity to pre-defined criteria stored in industry skills database 110 to determine whether the cross training of the user meets the requirements of the performance of the activity in the other industry. In an embodiment, cross-industry training program 106 determines whether the user's competence and/or accuracy of activity performance exceeds a minimum threshold of competence and/or accuracy. For example, cross-industry training program 106 determines if the user places a virtual package in the correct location of the virtual work environment more than eighty percent of the time.

If cross-industry training program 106 determines that the performance of the activity is not acceptable ("no" branch, decision block 320), then cross-industry training program 106 notifies the user that training is not complete (step 322). In an embodiment, if cross-industry training program 106 determines that the performance of the virtual activity by the user does not meet pre-defined criteria, then cross-industry training program 106 notifies the user, via user interface 114, that additional cross training is required prior to the user being ready to switch jobs. Responsive to notifying the user that the training is not complete, cross-industry training program 106 returns to step 302 to receive additional task data from the user.

If cross-industry training program 106 determines that the performance of the activity is acceptable ("yes" branch, decision block 320), then cross-industry training program 106 notifies the user that training is complete (step 324). In an embodiment, if cross-industry training program 106 determines that the performance of the virtual activity by the user does meet pre-defined criteria, then cross-industry training program 106 notifies the user, via user interface 114, that cross training of the user in the job role of the other industry is complete. In an embodiment, cross-industry training program 106 provides the user a certificate of completion of the cross training that the user can present to a prospective employer to prove that the user has been trained in the new role.

Figure 4:
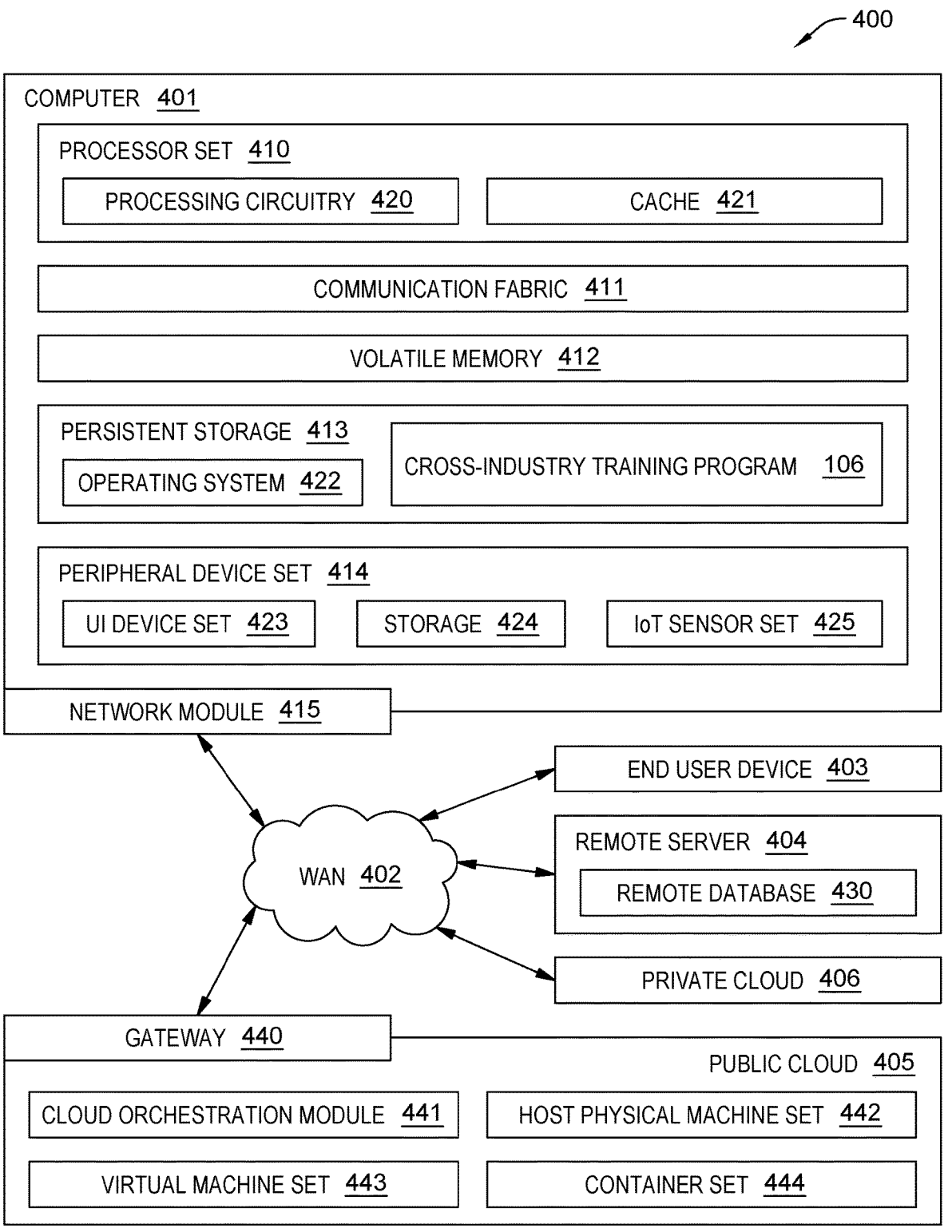
FIG. 4 depicts a block diagram of components of a computing environment representing the distributed data processing environment of FIG. 1, in accordance with an embodiment of the present invention.

FIG. 4 depicts a block diagram of components of server computer 104 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Computing environment 400 contains an example of an environment for the execution of at least some of the computer code involved in performing the inventive methods, such as cross-industry training program 106 for mixed reality scenario generation for cross industry training. In addition to cross-industry training program 106, computing environment 400 includes, for example, computer 401, wide area network (WAN) 402, end user device (EUD) 403, remote server 404, public cloud 405, and private cloud 406. In this embodiment, computer 401 includes processor set 410 (including processing circuitry 420 and cache 421), communication fabric 411, volatile memory 412, persistent storage 413 (including operating system 422 and cross-industry training program 106, as identified above), peripheral device set 414 (including user interface (UI), device set 423, storage 424, and Internet of Things (IoT) sensor set 425), and network module 415. Remote server 404 includes remote database 430. Public cloud 405 includes gateway 440, cloud orchestration module 441, host physical machine set 442, virtual machine set 443, and container set 444.

Computer 401, which represents server computer 104 of FIG. 1, may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 430. As is well understood in the art of computer technology, and depending upon the technology, performance of a computer-implemented method may be distributed among multiple computers and/or between multiple locations. On the other hand, in this presentation of computing environment 400, detailed discussion is focused on a single computer, specifically computer 401, to keep the presentation as simple as possible. Computer 401 may be located in a cloud, even though it is not shown in a cloud in FIG. 4. On the other hand, computer 401 is not required to be in a cloud except to any extent as may be affirmatively indicated.

Processor set 410 includes one, or more, computer processors of any type now known or to be developed in the future. Processing circuitry 420 may be distributed over multiple packages, for example, multiple, coordinated integrated circuit chips. Processing circuitry 420 may implement multiple processor threads and/or multiple processor cores. Cache 421 is memory that is located in the processor chip package(s) and is typically used for data or code that should be available for rapid access by the threads or cores running on processor set 410. Cache memories are typically organized into multiple levels depending upon relative proximity to the processing circuitry. Alternatively, some, or all, of the cache for the processor set may be located "off chip." In some computing environments, processor set 410 may be designed for working with qubits and performing quantum computing.

Computer readable program instructions are typically loaded onto computer 401 to cause a series of operational steps to be performed by processor set 410 of computer 401 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 421 and the other storage media discussed below. The program instructions, and associated data, are accessed by processor set 410 to control and direct performance of the inventive methods. In computing environment 400, at least some of the instructions for performing the inventive methods may be stored in cross-industry training program 106 in persistent storage 413.

Communication fabric 411 is the signal conduction paths that allow the various components of computer 401 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 412 is any type of volatile memory now known or to be developed in the future. Examples include dynamic type random access memory (RAM) or static type RAM. Typically, the volatile memory is characterized by random access, but this is not required unless affirmatively indicated. In computer 401, the volatile memory 412 is located in a single package and is internal to computer 401, but, alternatively or additionally, the volatile memory may be distributed over multiple packages and/or located externally with respect to computer 401.

Persistent storage 413 is any form of non-volatile storage for computers that is now known or to be developed in the future. The non-volatility of this storage means that the stored data is maintained regardless of whether power is being supplied to computer 401 and/or directly to persistent storage 413. Persistent storage 413 may be a read only memory (ROM), but typically at least a portion of the persistent storage allows writing of data, deletion of data and re-writing of data. Some familiar forms of persistent storage include magnetic disks and solid-state storage devices. Operating system 422 may take several forms, such as various known proprietary operating systems or open-source Portable Operating System Interface type operating systems that employ a kernel. The code included in cross-industry training program 106 typically includes at least some of the computer code involved in performing the inventive methods.

Peripheral device set 414 includes the set of peripheral devices of computer 401. Data communication connections between the peripheral devices and the other components of computer 401 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 423 may include components such as a display screen, speaker, microphone, wearable devices (such as goggles and smart watches), keyboard, mouse, printer, touchpad, game controllers, and haptic devices. Storage 424 is external storage, such as an external hard drive, or insertable storage, such as an SD card. Storage 424 may be persistent and/or volatile. In some embodiments, storage 424 may take the form of a quantum computing storage device for storing data in the form of qubits. In embodiments where computer 401 is required to have a large amount of storage (for example, where computer 401 locally stores and manages a large database) then this storage may be provided by peripheral storage devices designed for storing very large amounts of data, such as a storage area network (SAN) that is shared by multiple, geographically distributed computers. IoT sensor set 425 is made up of sensors that can be used in Internet of Things applications, as discussed with respect to sensor(s) 120. For example, one sensor may be a thermometer and another sensor may be a motion detector.

Network module 415 is the collection of computer software, hardware, and firmware that allows computer 401 to communicate with other computers through WAN 402. Network module 415 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 415 are performed on the same physical hardware device. In other embodiments (for example, embodiments that utilize software-defined networking (SDN)), the control functions and the forwarding functions of network module 415 are performed on physically separate devices, such that the control functions manage several different network hardware devices. Computer readable program instructions for performing the inventive methods can typically be downloaded to computer 401 from an external computer or external storage device through a network adapter card or network interface included in network module 415.

WAN 402 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 403 is any computer system that is used and controlled by an end user (for example, a customer of an enterprise that operates computer 401) and may take any of the forms discussed above in connection with computer 401. EUD 403 typically receives helpful and useful data from the operations of computer 401. For example, in a hypothetical case where computer 401 is designed to provide a recommendation to an end user, this recommendation would typically be communicated from network module 415 of computer 401 through WAN 402 to EUD 403. In this way, EUD 403 can display, or otherwise present, the recommendation to an end user. In some embodiments, EUD 403 may be a client device, such as thin client, heavy client, mainframe computer, desktop computer and so on.

Remote server 404 is any computer system that serves at least some data and/or functionality to computer 401. Remote server 404 may be controlled and used by the same entity that operates computer 401. Remote server 404 represents the machine(s) that collect and store helpful and useful data for use by other computers, such as computer 401. For example, in a hypothetical case where computer 401 is designed and programmed to provide a recommendation based on historical data, then this historical data may be provided to computer 401 from remote database 430 of remote server 404.

Public cloud 405 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 405 is performed by the computer hardware and/or software of cloud orchestration module 441. The computing resources provided by public cloud 405 are typically implemented by virtual computing environments that run on various computers making up the computers of host physical machine set 442, which is the universe of physical computers in and/or available to public cloud 405. The virtual computing environments (VCEs) typically take the form of virtual machines from virtual machine set 443 and/or containers from container set 444. It is understood that these VCEs may be stored as images and may be transferred among and between the various physical machine hosts, either as images or after instantiation of the VCE. Cloud orchestration module 441 manages the transfer and storage of images, deploys new instantiations of VCEs and manages active instantiations of VCE deployments. Gateway 440 is the collection of computer software, hardware, and firmware that allows public cloud 405 to communicate through WAN 402.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 406 is similar to public cloud 405, except that the computing resources are only available for use by a single enterprise. While private cloud 406 is depicted as being in communication with WAN 402, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 405 and private cloud 406 are both part of a larger hybrid cloud.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The foregoing descriptions of the various embodiments of the present invention have been presented for purposes of illustration and example but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   receiving, by one or more computer processors, first sensor data from one or more sensor devices located in a work environment associated with a first industry, wherein the one or more sensor devices are positioned in the work environment to enable features of the work environment to be captured in the first sensor data;

analyzing, by one or more computer processors, the first sensor data to identify the work environment associated with the first industry based on the features captured in the first sensor data and match the features with one or more tasks performed within the work environment of the first industry;

identifying, by one or more computer processors, an activity in the first industry associated with the work environment and the one or more tasks;

determining, by one or more computer processors, that one or more activities associated with a job in a second industry correspond to the activity in the first industry;

generating, by one or more computer processors, a mixed reality scenario representing a virtual work environment associated with the second industry using mixed reality technology;

generating, by one or more computer processors, the one or more activities associated with the job in the second industry in the mixed reality scenario, wherein the one or more activities are generated to allow user performance of the one or more activities to be detected by at least one sensor device;

displaying, by one or more computer processors, the virtual work environment associated with the second industry and the one or more activities associated with the job in the second industry to a user in a device for viewing the mixed reality scenario while the user performs the activity in the first industry; and responsive to at least one sensor device detecting user performance of the one or more activities associated with the job in the second industry, evaluating in real time, by one or more computer processors, the user performance of the one or more activities using second sensor data generated by the at least one sensor device.

2. The computer-implemented method of claim 1, wherein the first and second sensor data is received from sensor devices selected from a group consisting of: a gaze point tracker, an imaging device, a microphone, environmental sensor, a global positioning system (GPS) device, an accelerometer, a pressure sensor, and a biometric sensor.

3. The computer-implemented method of claim 1, wherein determining that the one or more activities associated with the job in the second industry correspond to the activity in the first industry includes comparing one or more movements of a user, comparing one or more required tools, and comparing one or more required physical attributes of the user.

4. The computer-implemented method of claim 1, wherein generating the virtual work environment associated with the job in the second industry is performed using a generative adversarial network (GAN) module.

5. The computer-implemented method of claim 1, wherein evaluating user performance of the one or more activities further comprises:

storing, by one or more computer processors, the second sensor data associated with the performance of the one or more activities associated with the job in the second industry;

determining, by one or more computer processors, the performance of the one or more activities associated with the job in the second industry is acceptable; and notifying, by one or more computer processors, the user that training for the job in the second industry is complete.

6. The computer-implemented method of claim 1, further comprising:

comparing, by one or more computer processors, the one or more tasks associated with the first activity of the first industry and the one or more tasks associated with the second activity of the second industry;

based on the comparing, identifying, by one or more computer processors, one or more similarities between the one or more tasks associated with the first activity of the first industry and the one or more tasks associated with the second activity of the second industry; and storing, by one or more computer processors, the one or more similarities between the one or more tasks associated with the first activity of the first industry and the one or more tasks associated with the second activity of the second industry.

7. The computer-implemented method of claim 6, wherein identifying the one or more similarities between the one or more tasks associated with the first activity of the first industry and the one or more tasks associated with the second activity of the second industry further comprises:

determining, by one or more computer processors, a degree of similarity between two tasks by calculating a similarity score between at least one of the one or more tasks associated with the first activity of the first industry and at least one of the one or more tasks associated with the second activity of the second industry based on a pre-defined number of attributes associated with each task.

8. A computer program product comprising:

one or more computer readable storage media and program instructions collectively stored on the one or more computer readable storage media, the stored program instructions comprising:

program instructions to receive first sensor data from one or more sensor devices located in a work environment associated with a first industry, wherein the one or more sensor devices are positioned in the work environment to enable features of the work environment to be captured in the first sensor data;

program instructions to analyze the first sensor data to identify the work environment associated with the first industry based on the features captured in the first sensor data and match the features with one or more tasks performed within the work environment of the first industry;

program instructions to identify an activity in the first industry associated with the work environment and the one or more tasks;

program instructions to determine that one or more activities associated with a job in a second industry correspond to the activity in the first industry;

program instructions to generate a mixed reality scenario representing a virtual work environment associated with the second industry using mixed reality technology;

program instructions to generate the one or more activities associated with the job in the second industry in the mixed reality scenario, wherein the one or more activities are generated to allow user performance of the one or more activities to be detected by at least one sensor device;

program instructions to display the virtual work environment associated with the second industry and the one or more activities associated with the job in the second industry to the user in a device for viewing the mixed reality scenario while the user performs the activity in the first industry; and responsive to the at least one sensor device detecting user performance of the one or more activities associated with the job in the second industry, program instructions to evaluate in real time the user performance of the one or more activities using second sensor data generated by the at least one sensor device.

9. The computer program product of claim 8, wherein the first and second sensor data is received from sensor devices selected from a group consisting of: a gaze point tracker, an imaging device, a microphone, environmental sensor, a global positioning system (GPS) device, an accelerometer, a pressure sensor, and a biometric sensor.

10. The computer program product of claim 8, wherein the stored program instructions to determine that the one or more activities associated with the job in the second industry correspond to the activity in the first industry includes comparing one or more movements of the user, comparing one or more required tools, and comparing one or more required physical attributes of the user.

11. The computer program product of claim 8, wherein the stored program instructions to generate the virtual work environment associated with the job in the second industry use a generative adversarial network (GAN) module.

12. The computer program product of claim 8, wherein the stored program instructions to evaluate user performance further comprise:

program instructions to store the sensor activity data associated with the performance of the one or more activities associated with the job in the second industry;

program instructions to determine the performance of the one or more activities associated with the job in the second industry is acceptable; and program instructions to notify the user that training for the job in the second industry is complete.

13. The computer program product of claim 8, the stored program instructions further comprising:

program instructions to compare the one or more tasks associated with the first activity of the first industry and the one or more tasks associated with the second activity of the second industry;

program instructions to identify one or more similarities between the one or more tasks associated with the first activity of the first industry and the one or more tasks associated with the second activity of the second industry based on the comparing of the one or more tasks associated with the first activity of the first industry and the one or more tasks associated with the second activity of the second industry; and program instructions to store the one or more similarities between the one or more tasks associated with the first activity of the first industry and the one or more tasks associated with the second activity of the second industry.

14. The computer program product of claim 13, wherein the program instructions to identify the one or more similarities between the one or more tasks associated with the first activity of the first industry and the one or more tasks associated with the second activity of the second industry comprise:

program instructions to determine a degree of similarity between two tasks by calculating a similarity score between at least one of the one or more tasks associated with the first activity of the first industry and at least one of the one or more tasks associated with the second activity of the second industry based on a pre-defined number of attributes associated with each task.

15. A computer system comprising:

one or more computer processors;

one or more computer readable storage media;

program instructions collectively stored on the one or more computer readable storage media for execution by at least one of the one or more computer processors, the stored program instructions comprising:

program instructions to receive first sensor data from one or more sensor devices located in a work environment associated with a first industry, wherein the one or more sensor devices are positioned in the work environment to enable features of the work environment to be captured in the first sensor data;

program instructions to analyze the first sensor data to identify the work environment associated with the first industry based on the features captured in the first sensor data and match the features with one or more tasks performed within the work environment of the first industry;

program instructions to identify an activity in the first industry associated with the work environment and the one or more tasks;

program instructions to determine that one or more activities associated with a job in a second industry correspond to the activity in the first industry;

program instructions to generate a mixed reality scenario representing a virtual work environment associated with the second industry using mixed reality technology;

program instructions to generate the one or more activities associated with the job in the second industry in the mixed reality scenario, wherein the one or more activities are generated to allow user performance of the one or more activities to be detected by at least one sensor device;

program instructions to display the virtual work environment associated with the second industry and the one or more activities associated with the job in the second industry to the user in a device for viewing the mixed reality scenario while the user performs the activity in the first industry; and responsive to the at least one sensor device detecting user performance of the one or more activities associated with the job in the second industry, program instructions to evaluate in real time the user performance of the one or more activities using second sensor data generated by the at least one sensor device.

16. The computer system of claim 15, wherein the stored program instructions to determine that the one or more activities associated with the job in the second industry correspond to the activity in the first industry includes comparing one or more movements of the user, comparing one or more required tools, and comparing one or more required physical attributes of the user.

17. The computer system of claim 15, wherein the stored program instructions to generate the virtual work environment associated with the job in the second industry use a generative adversarial network (GAN) module.

18. The computer system of claim 15, wherein the stored program instructions to evaluate user performance further comprise:

program instructions to store the sensor activity data associated with the performance of the one or more activities associated with the job in the second industry;

program instructions to determine the performance of the one or more activities associated with the job in the second industry is acceptable; and program instructions to notify the user that training for the job in the second industry is complete.

19. The computer system of claim 15, the stored program instructions further comprising:

program instructions to compare the one or more tasks associated with the first activity of the first industry and the one or more tasks associated with the second activity of the second industry;

program instructions to identify one or more similarities between the one or more tasks associated with the first activity of the first industry and the one or more tasks associated with the second activity of the second industry based on the comparing of the one or more tasks associated with the first activity of the first industry and the one or more tasks associated with the second activity of the second industry; and program instructions to store the one or more similarities between the one or more tasks associated with the first activity of the first industry and the one or more tasks associated with the second activity of the second industry.

20. The computer system of claim 19, wherein the program instructions to identify the one or more similarities between the one or more tasks associated with the first activity of the first industry and the one or more tasks associated with the second activity of the second industry comprise:

program instructions to determine a degree of similarity between two tasks by calculating a similarity score between at least one of the one or more tasks associated with the first activity of the first industry and at least one of the one or more tasks associated with the second activity of the second industry based on a pre-defined number of attributes associated with each task.

* * * * *